US012776216B2

(12) United States Patent
Okuda et al.

(10) Patent No.: US 12,776,216 B2
(45) Date of Patent: Oct. 27, 2026

(54) INFORMATION PROCESSING DEVICE

(71) Applicant: TOYOTA JIDOSHA KABUSHIKI KAISHA, Toyota (JP)

(72) Inventors: Masataka Okuda, Toyota (JP); Masatoshi Kakutani, Miyoshi (JP); Kaoru Yoshida, Nisshin (JP); Kanade Kuriyama, Toyota (JP); Toshiki Shinohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 18/476,883

(22) Filed: Sep. 28, 2023

(65) Prior Publication Data

US 2024/0203257 A1 Jun. 20, 2024

(30) Foreign Application Priority Data

Dec. 19, 2022 (JP) ................................ 2022-202355

(51) Int. Cl.
*G08G 1/16* (2006.01)
*B60W 30/09* (2012.01)
*B60W 30/095* (2012.01)

(52) U.S. Cl.
CPC ............ *G08G 1/162* (2013.01); *B60W 30/09* (2013.01); *B60W 30/0953* (2013.01); *B60W 30/0956* (2013.01); *G08G 1/166* (2013.01); *B60W 2554/4041* (2020.02); *B60W 2556/50* (2020.02); *B60W 2756/10* (2020.02)

(58) Field of Classification Search
CPC ....... G08G 1/162; G08G 1/166; B60W 30/09; B60W 30/0953; B60W 30/0956; B60W 2554/4041; B60W 2556/50; B60W 2756/10
See application file for complete search history.

(56) References Cited

U.S. PATENT DOCUMENTS

| | | | | |
|---|---|---|---|---|
| 10,917,808 B2 * | 2/2021 | Nagamura | .............. | H04W 4/40 |
| 2010/0228419 A1 * | 9/2010 | Lee | ...................... | G05D 1/0246 701/25 |
| 2022/0201204 A1 * | 6/2022 | Hirata | .................... | H04N 25/50 |

FOREIGN PATENT DOCUMENTS

| | | | |
|---|---|---|---|
| JP | 2019505059 A * | | 2/2019 |
| WO | 2017/079290 A1 | | 5/2017 |
| WO | WO-2017079290 | * | 5/2017 |

OTHER PUBLICATIONS

U.S. Appl. No. 18/342,787, filed Jun. 28, 2023 (Year: 2023).*
U.S. Appl. No. 18/342,787, filed Jun. 28, 2023.

* cited by examiner

*Primary Examiner* — Helal A Algahaim
(74) *Attorney, Agent, or Firm* — SoraIP, Inc.

(57) ABSTRACT

An information processing device for remotely controlling a vehicle, the information processing device comprising: an acquisition unit that acquires a plurality of requests related to control of a target vehicle from a plurality of applications; a processing unit that arbitrates the plurality of requests acquired by the acquisition unit; and a communication unit that transmits an instruction for control based on a result of arbitration by the processing unit to the target vehicle, wherein the processing unit assigns a level indicating a percentage of permission to each of the plurality of requests based on a range set according to a surrounding object that is an object existing in the vicinity of the target vehicle, and arbitrates the plurality of requests based on the level.

8 Claims, 8 Drawing Sheets

INFORMATION PROCESSING DEVICE

CROSS-REFERENCE TO RELATED APPLICATION

This application claims priority to Japanese Patent Application No. 2022-202355 filed on Dec. 19, 2022, incorporated herein by reference in its entirety.

BACKGROUND

1. Technical Field

The present disclosure relates to an information processing device that remotely controls a vehicle.

2. Description of Related Art

Japanese Unexamined Patent Application Publication No. 2019-505059 (JP 2019-505059 A) discloses an autonomous vehicle service platform. The autonomous vehicle service platform is connected to a plurality of autonomous vehicles that is autonomously driven on a road network, via a network so as to be able to communicate with the autonomous vehicles. The autonomous vehicle service platform remotely controls the autonomous vehicles and provides a user with various services using the autonomous vehicle.

SUMMARY

In a case in which there is a plurality of applications, the applications providing services by remote control, when a plurality of pieces of vehicle control requested from the applications is instructed to a vehicle in such a manner that the pieces of vehicle control are individually instructed as they are, there is a possibility that interference between the pieces of vehicle controls requested by the applications or interference between the vehicle control requested by the application and other vehicle control performed in the vehicle may occur. Therefore, it is desired to perform optimal control for a vehicle by, for example, arbitrating the pieces of vehicle control requested from the applications.

The present disclosure has been made in view of the above issue, and an object of the present disclosure is to provide an information processing device capable of appropriately performing a plurality of pieces of vehicle control requested from a plurality of applications.

In order to solve the above issue, an aspect of the present disclosure is an information processing device that remotely controls a vehicle. The information processing device includes: an acquisition unit that acquires a plurality of requests related to control of a target vehicle from a plurality of applications; a processing unit that arbitrates the requests acquired by the acquisition unit; and a communication unit that transmits an instruction for control that is based on a result of arbitration by the processing unit, to the target vehicle. The processing unit gives a level indicating an allowable percentage to each of the requests based on a range set depending on a surrounding object that is an object present around the target vehicle, and arbitrates the requests based on the level.

With the information processing device according to the present disclosure, since the requests are arbitrated using the allowance level given to each of the requests, it is possible to appropriately perform the pieces of vehicle control requested from the applications.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The information processing device according to the present disclosure performs processing of determining a permission ratio regarding safety of a vehicle, determining interference with other controls performed in the vehicle, final arbitration of vehicle control, and correction according to characteristics of a driver for one or more vehicle controls requested from a plurality of applications. Through these processes, it is possible to appropriately execute a plurality of vehicle controls requested from a plurality of applications.

Hereinafter, an embodiment of the present disclosure will be described in detail with reference to the drawings.

Embodiment

Configuration

Figure 1:
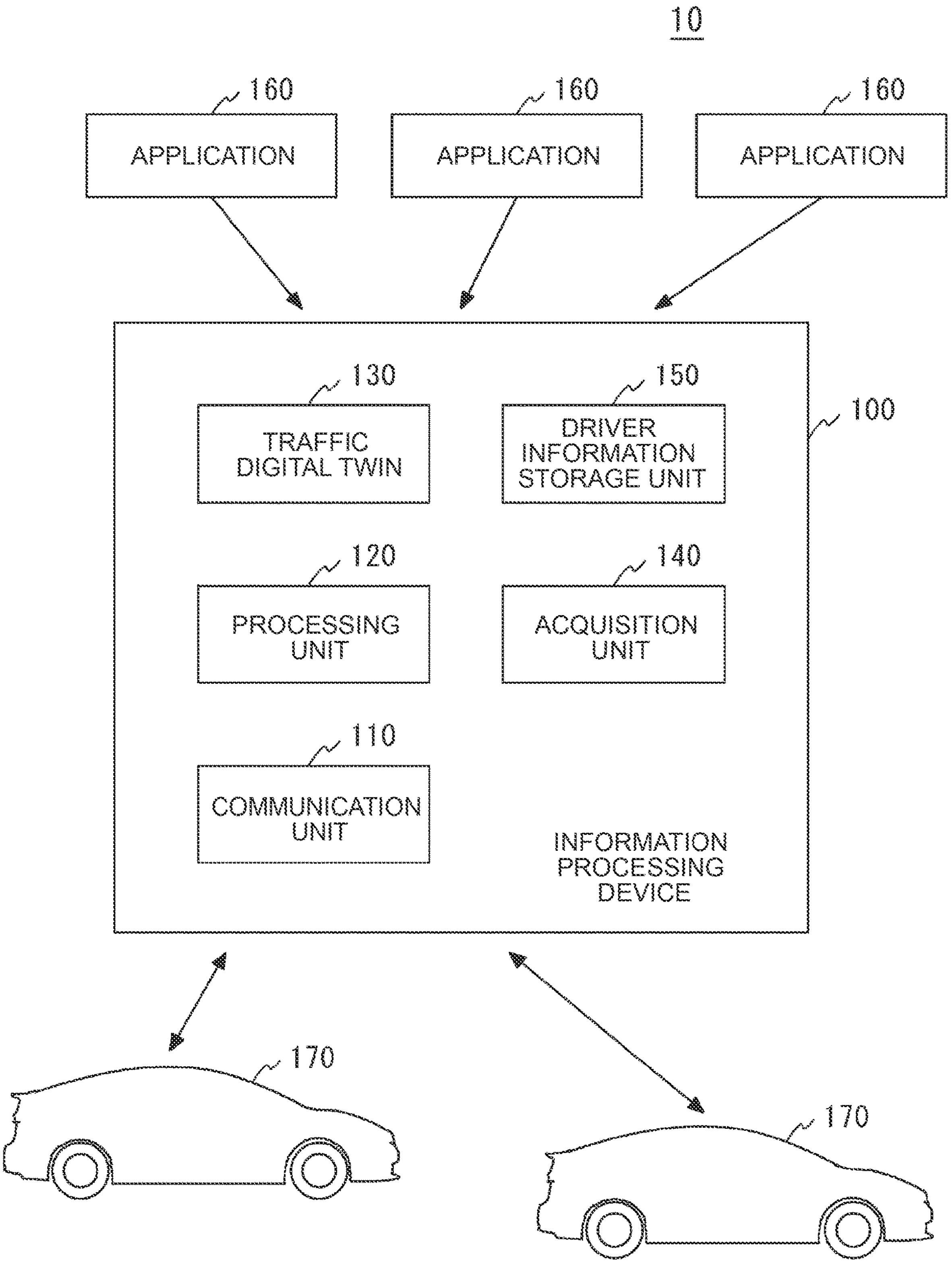
FIG. 1 is a schematic configuration diagram of a digital twin system including an information processing device according to an embodiment of the present disclosure.

FIG. 1 is a schematic diagram illustrating an overall configuration example of a digital twin system 10 including an information processing device 100 according to an embodiment of the present disclosure. The digital twin system 10 illustrated in FIG. 1 includes an information processing device 100, a plurality of applications 160, and a plurality of vehicles 170.

The plurality of applications 160 are configured to perform communication with the information processing device 100 and provide predetermined services (functions and values) to at least one of the plurality of vehicles 170 via the information processing device 100. Examples of the service implemented by the application 160 include a service for remotely controlling the movement (running, stopping, or turning) of the vehicle 170 and a service for notifying (danger notification/status notification) information around the vehicle 170. The plurality of applications 160 are implemented in, for example, an application server configured on a cloud. Alternatively, the plurality of applications 160 may be implemented in the information processing device 100.

The plurality of vehicles 170 are mobility configured to be able to communicate with the information processing device 100. The information processing device 100 and the plurality of vehicles 170 are communicably connected directly or via a communication base station (not shown). The plurality of vehicles 170 can provide information on the state of the host vehicle, data related to the generation of a traffic digital twin 130 (described later) constructed in the information processing device 100, and a request related to a predetermined service to the information processing device 100. The information regarding the state of the host vehicle includes the position of the vehicle 170, the speed of the vehicle 170, the traveling direction of the vehicle 170, information necessary for specifying the driver, and the like. The data related to the generation of the traffic digital twin 130 includes data related to other than the host vehicle, such as other vehicles, buildings, and pedestrians, which are objects existing around the vehicle 170. Various sensors (not shown) mounted on each vehicle 170 can be used to acquire the information and data. Further, the plurality of vehicles 170 can receive, from the information processing device 100, an instruction (control instruction value) regarding control for realizing various services provided by the plurality of applications 160. The number of vehicles 170 communicating with the information processing device 100 is not particularly limited.

The information processing device 100 is configured to be able to communicate with a plurality of applications 160 and a plurality of vehicles 170. The information processing device 100 can optimize vehicle control required from the plurality of applications 160 in order to realize a predetermined service (traffic control service or the like) on the basis of vehicle data including information on the state of the host vehicle acquired from the plurality of vehicles 170, and provide the vehicle control to the vehicle 170 to be controlled. As the information processing device 100, a cloud server configured on a cloud can be exemplified.

The information processing device 100 includes a communication unit 110, a processing unit 120, a traffic digital twin 130, an acquisition unit 140, and a driver information storage unit 150. The information processing device 100 typically includes a processor such as a CPU (Central Processing Unit), a memory such as a RAM (Random Access Memory), a readable/writable storage medium such as a hard disk drive (HDD) or a solid state drive (SSD), an input/output interface, and the like. In addition, the information processing device 100 realizes all or a part of the functions executed by the communication unit 110, the processing unit 120, and the acquisition unit 140 by the processor reading and executing the program stored in the memory.

The communication unit 110 executes communication with the plurality of applications 160, and receives a request related to control of the vehicle 170 output by each application 160. Further, the communication unit 110 executes communication with the plurality of vehicles 170, and receives (acquires) vehicle data including information on the state of the host vehicle (such as the position, speed, traveling direction, and driver information of the vehicle), data related to the generation of the traffic digital twin 130 (such as data related to the surroundings of the vehicle and data related to communication quality), and the like from the plurality of vehicles 170 and the like. In addition, the communication unit 110 transmits a control instruction value or the like necessary for realizing the service to the vehicle 170 that has requested the provision of the service among the plurality of vehicles 170.

The processing unit 120 is responsible for overall control of the information processing device 100, including communication with the plurality of vehicles 170, management of the traffic digital twin 130, and vehicle control related to services requested from the plurality of applications 160. In particular, the processing unit 120 of the present embodiment performs optimization (safety assurance, interference avoidance, arbitration, correction, and the like) of requests for a plurality of vehicle control requests received from the plurality of applications 160 and instructs the vehicle 170. Details of the control 20 performed by the processing unit 120 will be described later.

The traffic digital twin 130 is a virtual world (virtual space) in which a real world (real space) in which a plurality of vehicles 170 exist is reproduced on a cloud computer in synchronization with a real world. The traffic digital twin 130 is generated based on data related to current and past vehicle conditions acquired (collected) from the plurality of vehicles 170, and the like. In the traffic digital twin 130, all objects (moving objects/stationary objects) and traffic conditions on a traveling (moving) road in a place (road, parking lot, or the like) where various devices participating in the digital twin system 10 including the plurality of vehicles 170 can travel (move) are duplicated. Examples of the information included in the data for generating the traffic digital twin 130 include vehicle information (VIN and the like), information on other vehicles (including a bicycle, a pedestrian, and the like), map information, time information (time stamp), position information (GPS latitude/longitude), and trajectory information (vehicle speed, direction, and the like) that is a travel track.

The acquisition unit 140 acquires a plurality of requests related to remote control of the vehicle 170 to be controlled from the plurality of applications 160 via the communication unit 110. Examples of the content of the request include an instruction such as a speed, an acceleration, a deceleration, a steering angle, and an execution time of the vehicle 170 to be controlled. Further, the acquisition unit 140 acquires, from the plurality of vehicles 170, information related to a driver driving each vehicle 170 via the communication unit 110. The driver information is acquired from the plurality of vehicles 170 by being included in the vehicle data together with the identification information (ID) of the driver.

The driver information storage unit 150 is a database that cumulatively stores the driver information acquired by the acquisition unit 140 for each driver. As the driver information to be collected, information such as an inter-vehicle distance, a speed, and an acceleration/deceleration speed taken by the driver during driving can be exemplified. The past driver information stored in the driver information storage unit 150 can be provided to the processing unit 120, or the driver's driving tendency (preference) can be grasped by analyzing or analyzing the past driver information. The driver information storage unit 150 may be configured not in the information processing device 100 but in an independent data server.

Control

Figure 2:
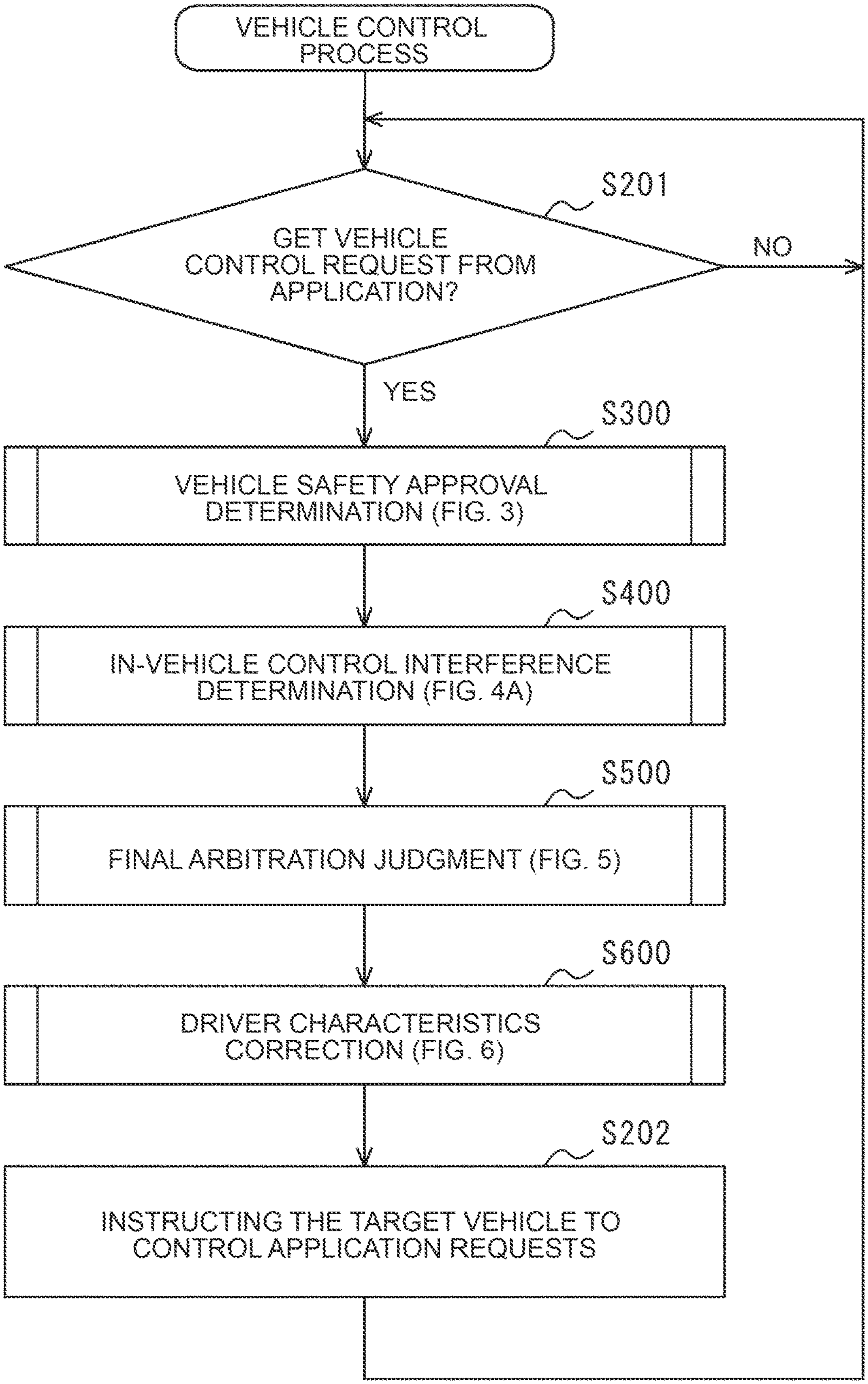
FIG. 2 is a processing flowchart of vehicle control executed by the information processing device.

Next, the control executed by the information processing device 100 according to the present embodiment will be described with further reference to FIG. 2 to FIG. 7. FIG. 2 is a flowchart illustrating a procedure of a vehicle control process executed by each component of the information processing device 100. The vehicle control process illustrated in FIG. 2 is started, for example, when the information processing device 100 receives a request to receive a service from a particular vehicle 170 (hereinafter referred to as "target vehicle 170*a*") serving as a client, and is repeatedly executed until there is no request from the target vehicle 170*a*.

S201

The acquisition unit 140 determines whether or not a request for vehicle control related to a service has been acquired from the plurality of applications 160. The number of requests determined by the acquisition unit 140 may be at least one. In addition, the demand for service-related vehicle control is a specific control indication value (e.g., a value such as a 25 m front after 3 seconds).

If the acquisition unit 140 determines that a request for vehicle control related to the service has been acquired from the application 160 (S201, Yes), the process proceeds to S300, otherwise (S201, No), the process waits until a request for vehicle control related to the service is acquired from the application 160.

S300

Figure 3:
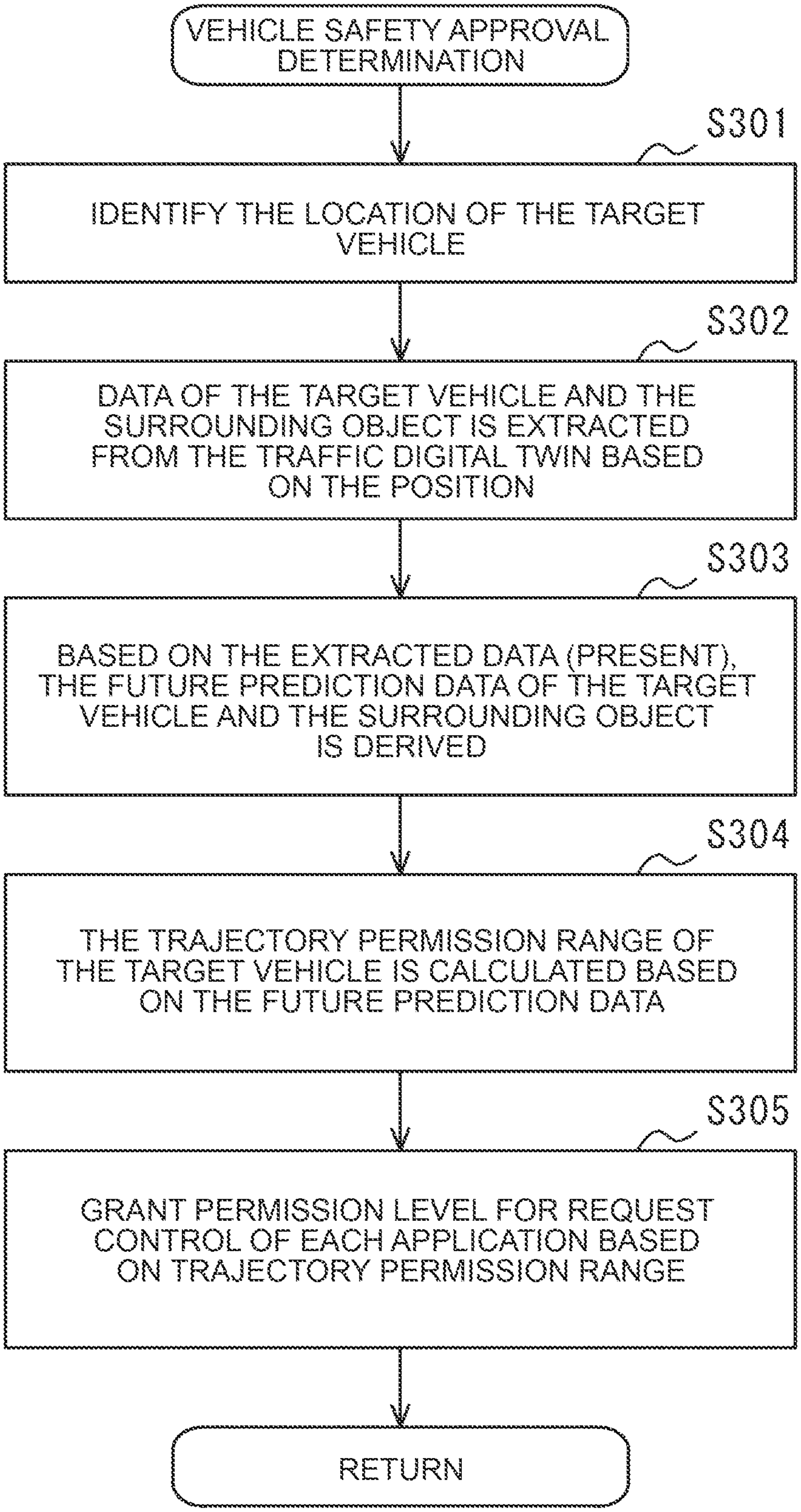
FIG. 3 is a processing flowchart of vehicle safety permission determination in vehicle control.

The processing unit 120 executes "vehicle safety permission determination" for granting, for one or more requests acquired by the acquisition unit 140, a permission level that is a level indicating a ratio at which the application 160 can permit execution of desired vehicle control for each request. FIG. 3 is a flow chart for explaining a detailed process sequence (S305 from S301) of the vehicle-safety permission determination executed in this S300.

Hereinafter, each process of the vehicle safety permission determination will be described with reference to FIG. 3.

S301

The processing unit 120 identifies the location of the target vehicle 170*a* that is to be provided with the service based on the one or more requests acquired by the acquisition unit 140. The position of the target vehicle 170*a* can be determined based on vehicle data received from the plurality of vehicles 170.

When the position of the target vehicle 170*a* is specified by the processing unit 120, the processing proceeds to S302.

S302

The processing unit 120 extracts, from the traffic digital twin 130, data of the target vehicle 170*a* and data (surrounding object data) of an object existing in the vicinity of the target vehicle 170*a* (hereinafter referred to as "surrounding object 170*b*") based on the identified position of the target vehicle 170*a*. The surrounding object 170*b* that needs to be extracted is, for example, a moving object or a stationary object that exists in a predetermined range from the target vehicle 170*a*. This surrounding object includes the position, the traveling direction, the speed, the acceleration/deceleration, and the like of the surrounding object 170*b*.

When the processing unit 120 extracts the target vehicle 170*a* and the surrounding object 170*b*, the processing proceeds to S303.

S303

The processing unit 120 derives future-predicted data of the target vehicle 170*a* and the surrounding object 170*b* based on the data of the target vehicle 170*a* and the surrounding object 170*b* extracted from the traffic digital twin 130. The future prediction data is data obtained by predicting the condition (position, orientation, etc.) of the target vehicle 170*a* and the surrounding object 170*b* after a predetermined time has elapsed from the present time, and can be predicted based on vehicle data received from a communicable object including the plurality of vehicles 170. The predetermined time is set to an appropriate time for the vehicle safety permission determination based on a control period necessary for providing a service in each application 160, a completion degree of the traffic digital twin 130, and the like.

Figure 7:
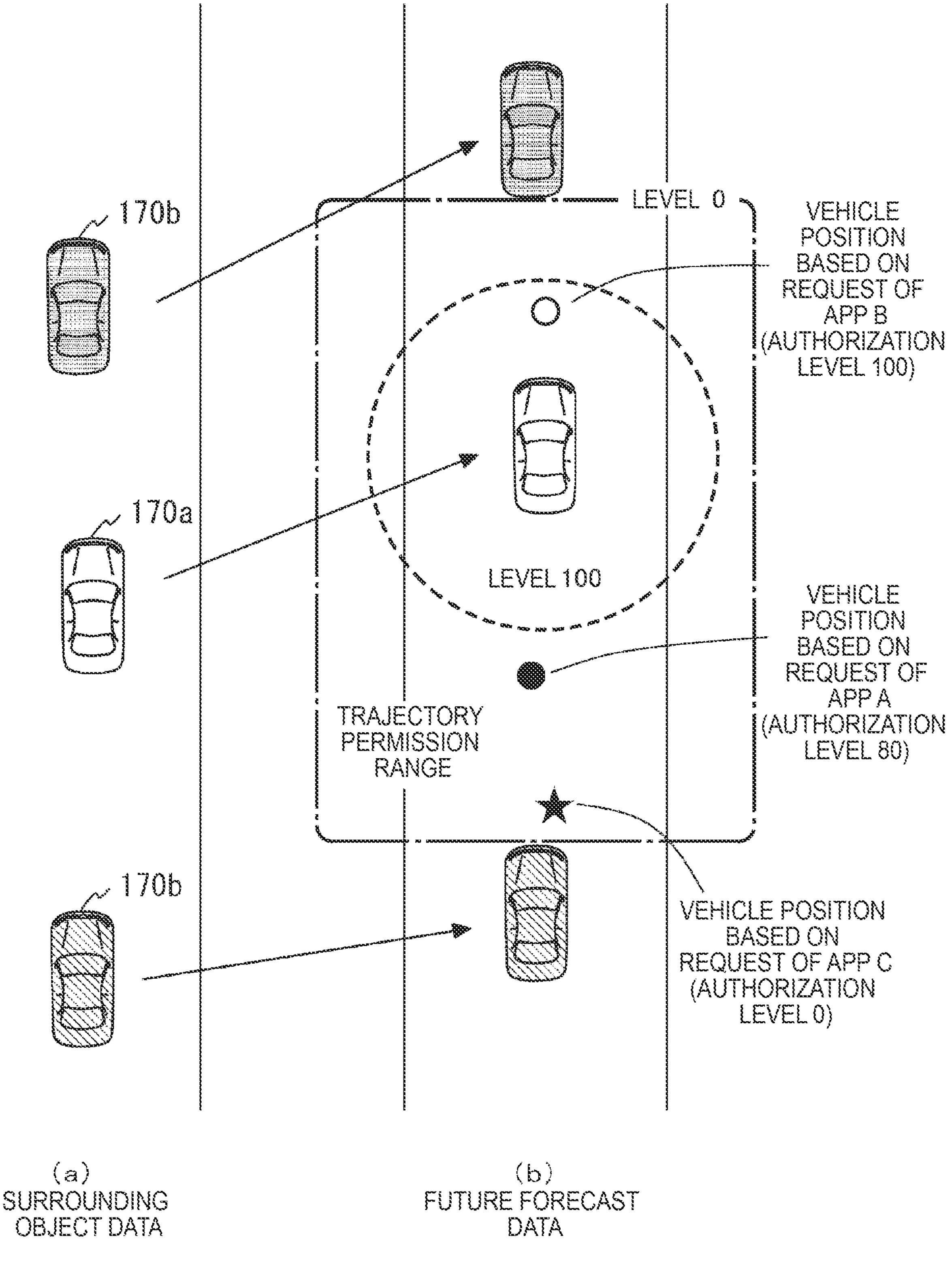
FIG. 7 is a diagram illustrating an example of a trajectory permission range and permission level used in vehicle safety permission determination.

FIG. 7 shows an image of a process of deriving future-predicted data ((b) of FIG. 7) from the present data ((a) of FIG. 7) of the target vehicle 170*a* and the surrounding object 170*b*. As illustrated in FIG. 7, in the future prediction data, each position (moving position) at a future time [T+t] (at (b) of FIG. 7) at which a predetermined time t has elapsed since the present time T (at (a) of FIG. 7) is predicted for the target vehicle 170*a* (open vehicle) and the two surrounding objects 170*b* (shaded vehicles).

When the processing unit 120 derives future-predicted data based on the data (present) of the target vehicle 170*a* and the surrounding object 170*b*, the processing proceeds to S304.

The traffic digital twin 130 may be used instead of the processing unit 120 to extract the surrounding object 170*b* and derive the future-prediction data. In this case, the processing unit 120 transmits the information regarding the position of the target vehicle 170*a* specified by the processing unit 120 to the traffic digital twin 130.

S304

The processing unit 120 calculates the trajectory permitted area of the target vehicle 170*a* based on the future-prediction data derived from the present data of the target vehicle 170*a* and the surrounding object 170*b*. The trajectory permitted range is a range (safety range) that is set as an area where the target vehicle 170*a* does not touch the surrounding object 170*b* at the respective positions of the target vehicle 170*a* and the surrounding object 170*b* based on the future-prediction-data.

(b) of FIG. 7 illustrates an example of a trajectory permission range. FIG. 7 is a diagram illustrating an example in which a range (dashed-dotted line) in which a vehicle rear portion of a surrounding object 170*b* existing in front of a target vehicle 170*a* and a vehicle front portion of a surrounding object 170*b* existing in the rear of the target vehicle 170*a* are defined as a trajectory permitted range with respect to the front-rear direction of the target vehicle 170*a*. In the embodiment of FIG. 7, since there is no surrounding object in the left-right direction of the target vehicle 170*a*, the trajectory permitted area has a rectangular shape having a predetermined width. However, the shape of the trajectory permission range is not particularly limited, and for example, when a surrounding object is also present in the left-right direction of the target-vehicle 170*a*, the trajectory permission range of the shape considering the surrounding object is set.

When the trajectory permitted area of the target vehicle 170*a* is calculated by the processing unit 120, the processing proceeds to S305.

S305

Based on the calculated trajectory permission range of the target vehicle 170*a*, the processing unit 120 assigns a ratio for permitting the execution of the vehicle control to each of the vehicle control (hereinafter referred to as "request control") related to the service requested by the application 160 acquired by the acquisition unit 140 in S201. The percentage of permission to perform after a vehicle is, in other words, the permission level obtained by quantifying the risk of collision. This permission level is determined by the position of the target vehicle 170*a* within the trajectory permission range after the control when the vehicle control is executed.

In FIG. 7, the permission level "100" is set within a range of a predetermined radius from the target vehicle 170*a* (inside of the broken line circle), the permission level "0" is set as the outer frame (on the dashed line) of the trajectory permission range, and the variation value is given in accordance with the distance between the permission levels "100" and "0". The permission level "100" is a level at which the possibility of collision with an object on the target vehicle 170*a* is zero even if the future-predicted data deviates from the actual condition due to an error of the vehicle data or the like. In (b) of FIG. 7, the permission level "80" is given to the vehicle control requested by the application A that is estimated to move the target vehicle 170*a* to the position indicated by the black circle after the control. The permission level "100" is given to the vehicle control requested by the application B which is estimated to move the target vehicle 170*a* to the position indicated by the white circle after the control. Furthermore, the permission level "0" is given to the vehicle control requested by the application C which is estimated to move the target vehicle 170*a* to the position of the black star after the control.

When the permission level is given to each of the required control of the application 160 by the processing unit 120, the vehicle-safety permission determination of the present S300 ends, and the processing proceeds to S400 of FIG. 2.

S400

Figure 4A:
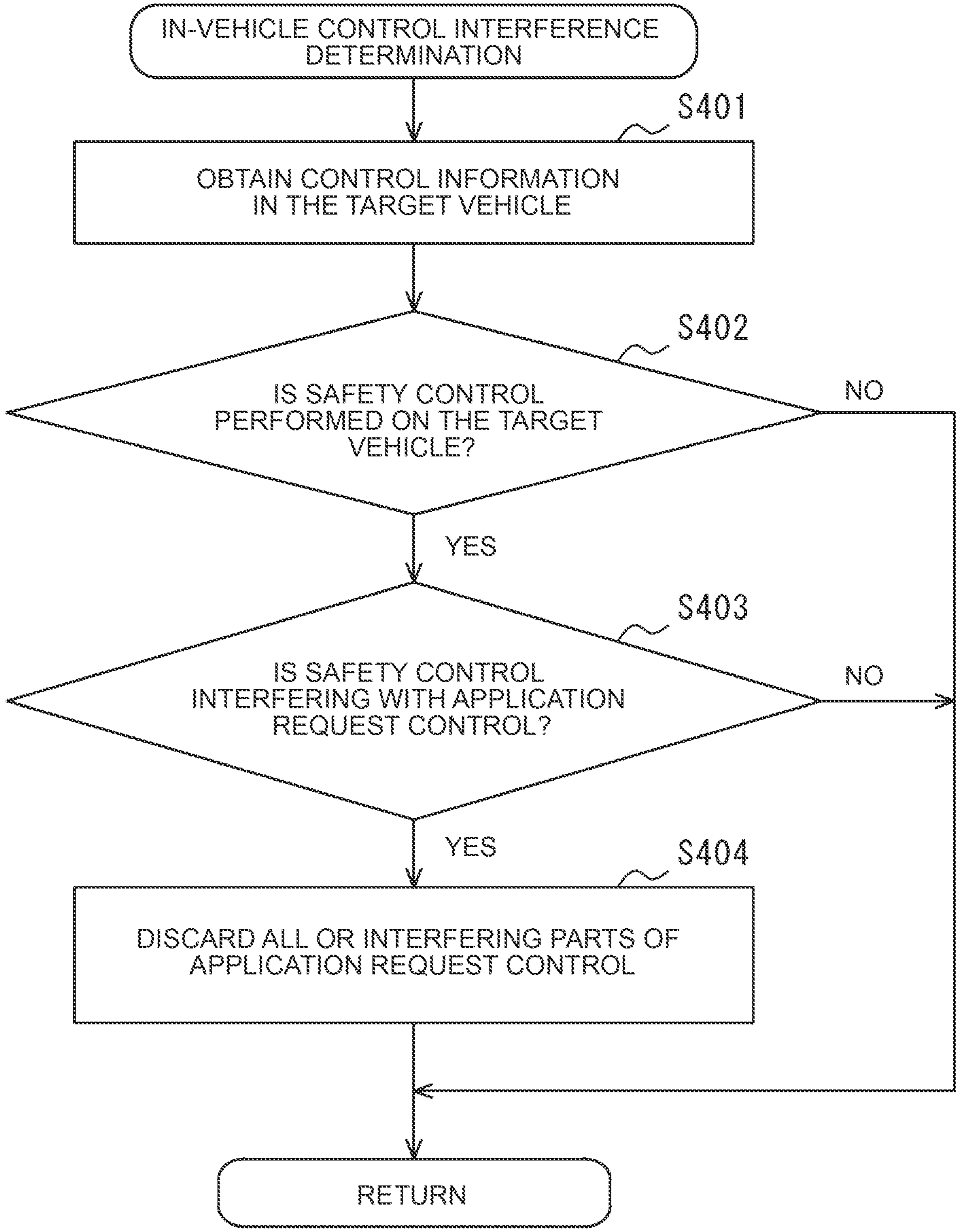
FIG. 4A is a process flow chart of in-vehicle control interferometry determination in vehicle control.
Figure 4B:
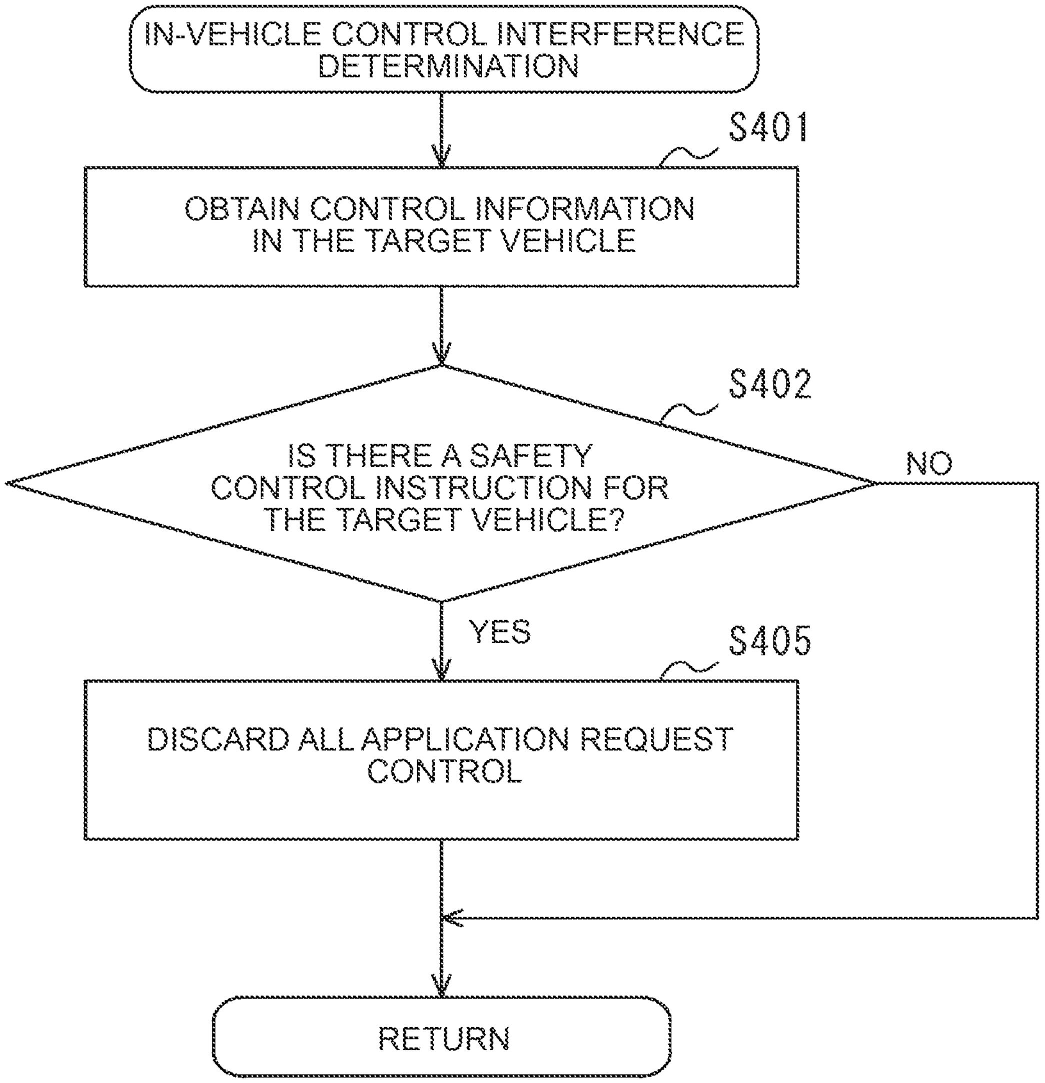
FIG. 4B is a process flow chart of other in-vehicle control interferometry determination in vehicle control.

The processing unit 120 determines whether or not the request control of the application 160 acquired by the acquisition unit 140 in S201 does not interfere with the particular control performed by the target vehicle 170*a* based on the in-vehicle function. When there is interference, the processing unit 120 executes "in-vehicle control interference determination" for eliminating the interference state. FIG. 4A is a flow chart for describing a detailed process sequence (from S401 to S404) of in-vehicle control interference determination performed in this S400.

Hereinafter, the respective processes of the in-vehicle control interference determination will be described referring to FIG. 4A.

S401

The processing unit 120 acquires various types of control performed by the target vehicle 170*a* in the vehicle based on the function mounted on the target vehicle. The information regarding the control of the target vehicle 170*a* can be acquired from the vehicle data received from the target vehicle 170*a* via the communication unit 110.

When the processing unit 120 acquires information related to the internal control of the target vehicle 170*a*, the processing proceeds to S402.

S402

The processing unit 120 determines whether or not the control related to the safety of the vehicle (hereinafter, referred to as "safety control") is performed in the target vehicle 170*a* on the basis of the information related to the internal control of the target vehicle 170*a*. The safety control is, for example, a braking/driving control or a steering control for avoiding a collision of the vehicle.

When the processing unit 120 determines that the safety control is performed in the target vehicle 170*a* (S402, Yes), the processing proceeds to S403. On the other hand, when the processing unit 120 determines that the safety control is not performed in the target vehicle 170*a* (S402, no), it can be determined that the safety of the target vehicle 170*a* is not affected even if a plurality of controls are executed at the same time, so that the in-vehicle control interference determination of the present S400 is completed, and the processing proceeds to S500 of FIG. 2.

S403

The processing unit 120 determines whether the safety control performed in the target vehicle 170*a* interferes with the requested control of the application 160. The interference determined here means that the control of the service provided by the application 160 may have an influence on the control of the function that leads to the safety of the vehicle. Therefore, if the required control of the application 160 is the provision of a service that does not affect, for example, the control of the function that leads to the safety of the target vehicle 170*a*, it can be determined that the interference does not occur even if the control is executed in an overlapping manner. Combinations of interfering controls may be defined in advance, or an instruction value for each control may be considered and determined each time.

When the processing unit 120 determines that the safety control of the target vehicle 170*a* interferes with the requested control of the application 160 (S403, Yes), the processing proceeds to S404. On the other hand, when the processing unit 120 determines that the safety control of the target vehicle 170*a* does not interfere with the requested control of the application 160 (S403, no), since the safety of the target vehicle 170*a* is not affected, the in-vehicle control interference determination of the present S400 ends, and the processing proceeds to S500 of FIG. 2.

S404

The processing unit 120 discards all of the request control of the application 160 or part of the request control of the application 160 that interferes with the safety control of the target vehicle 170*a*. By this process, it is possible to delete a vehicle control request from the application 160 that is not necessary for the target vehicle 170*a*.

When the processing unit 120 discards all or an interfering part of the requested control of the application 160, the in-vehicle control interference determination of the present S400 ends, and the processing proceeds to S500 of FIG. 2.

In the in-vehicle control interference determination in FIG. 4A illustrated above, when the processing unit 120 determines that the safety control is performed in the target vehicle 170*a* (S402, Yes), the processing unit 120 further determines whether or not the safety control of the target vehicle 170*a* interferes with the requested control of the application 160 (S403). However, in order to reduce the burden of the processing related to the determination of the interference, when the processing unit 120 determines that the safety control is performed in the target vehicle 170*a* (S402, Yes), for example, as in the processing flow chart shown in FIG. 4B, the processing unit 120 may immediately discard all of the requested control of the application 160 without determining the presence or absence of the interference (S405).

S500

Figure 5:
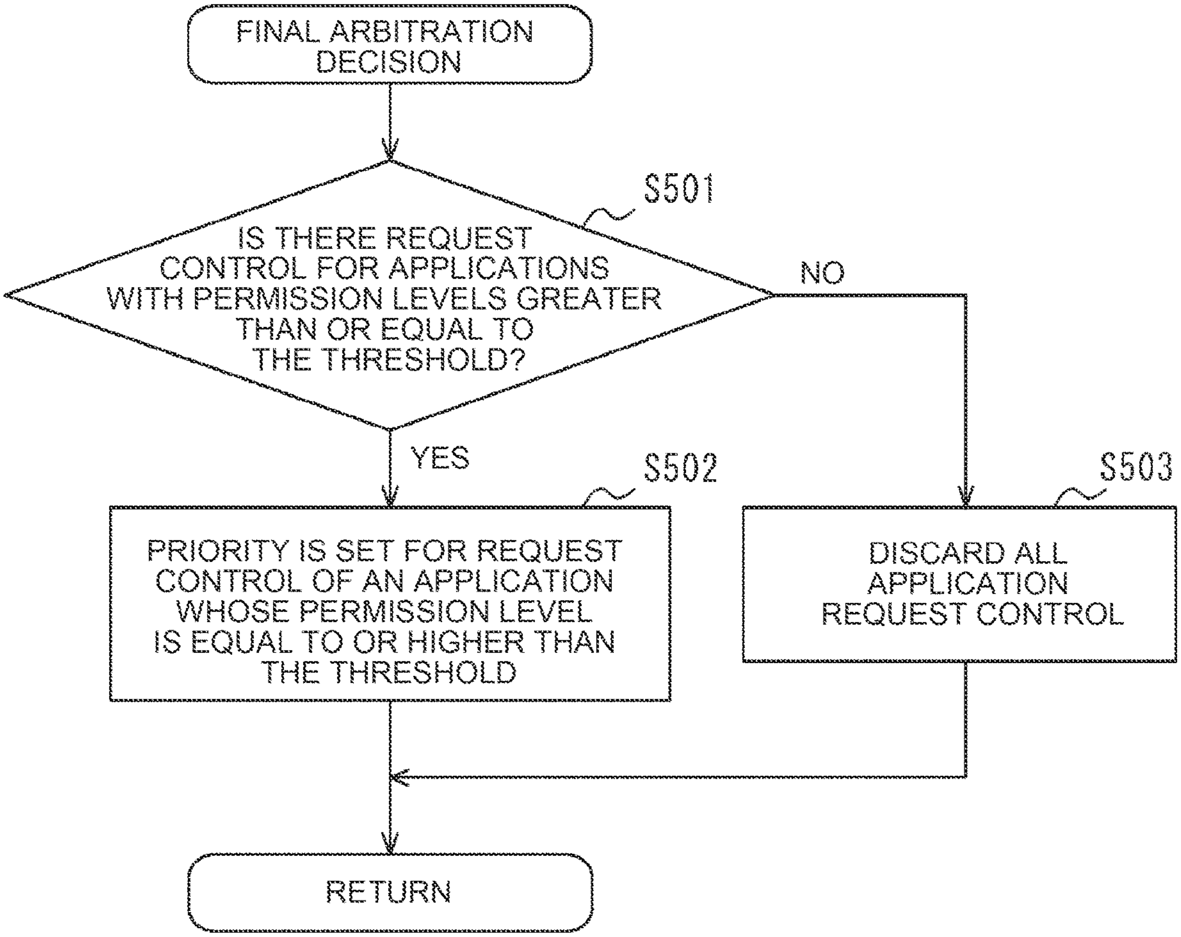
FIG. 5 is a processing flowchart of final arbitration determination in vehicle control.

The processing unit 120 executes "final arbitration determination" for determining whether or not the final execution is performed with respect to the request control of the one or more applications 160 on which the processes of the vehicle safety permission determination (S300) and the in-vehicle control interference determination (S400) described above have been performed. FIG. 5 is a flow chart for explaining a detailed process sequence (S503 from S501) of the final arbitration determination executed in this S500.

Hereinafter, each process of the final arbitration determination will be described with reference to FIG. 5.

S501

The processing unit 120 refers to the permission level assigned to the request control of the application 160 in the above S300, and determines whether there is request control of the application 160 whose permission level is equal to or greater than a predetermined threshold. This determination is made to select the required control of the application 160 that is unlikely to collide between the target vehicle 170*a* and the surrounding object 170*b*. As the predetermined threshold value, a predetermined fixed value may be used, or a variable value that can be changed according to a user's needs, such as a driver, may be used.

When the processing unit 120 determines that there is request-control of the application 160 whose permission level is equal to or higher than the predetermined threshold (S501, Yes), the processing proceeds to S502. On the other hand, when the processing unit 120 determines that there is no request-control of the application 160 whose permission level is equal to or higher than the predetermined threshold (S501, No), the processing proceeds to S503.

S502

When there are a plurality of request control of the application 160 whose permission level is equal to or higher than a predetermined threshold, the processing unit 120 sets the priority order in the plurality of request control. As an exemplary priority, the request control for decelerating (decelerating side) is prioritized over the request control (0G) for not performing acceleration/deceleration. Furthermore, the request control (0G) that does not perform acceleration/deceleration is prioritized over the request control (acceleration side) that performs acceleration (priority request control is performed in the order of deceleration side, 0G, and acceleration side). Further, as another example of the priority order, for example, the request control (straight-side 0G) that performs straight-ahead without acceleration/deceleration is prioritized over the request control (left-right lateral acceleration) that has a lateral acceleration in the left-right direction (priority request control is in the order of straight-side 0G and left-right lateral acceleration).

In FIG. 7, for example, when the predetermined threshold value is 70, the priority is given to the vehicle control requested by the application A having the permission level "80" and the vehicle control requested by the application B having the permission level "100". The vehicle control (permission level "80") requested by the application A on the deceleration side is set as the first priority. The vehicle control (permission level "100") requested by the application B on the acceleration side is set to the second priority.

When the priority is set in the request control of the application 160 whose permission level is equal to or higher than the predetermined threshold by the processing unit 120, the final arbitration determination of the present S500 ends, and the processing proceeds to S600 of FIG. 2.

S503

The processing unit 120 discards all of the request control of the application 160. By this processing, it is possible to delete a request for vehicle control from the application 160 having a low permission level.

When the processing unit 120 discards all of the required control of the application 160, the final arbitration determination of the present S500 ends, and the processing proceeds to S600 of FIG. 2.

S600

Figure 6:
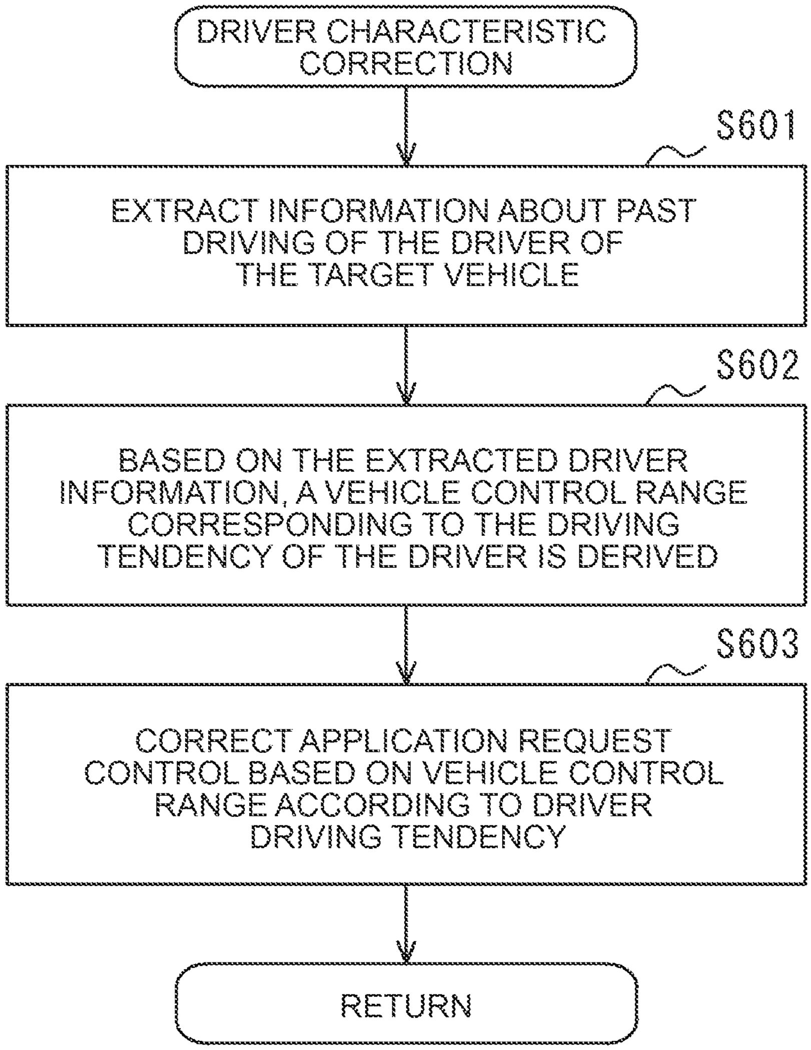
FIG. 6 is a process flow chart for correcting driver characteristics in vehicle control.

The processing unit 120 executes "driver characteristic correction" for correcting the required control of the one or more applications 160 that have performed the above-described final arbitration determination (S500) in accordance with the driving content favored by the driver. FIG. 6 is a flow chart for explaining a detailed process sequence (S603 from S601) for correcting driver properties performed in this S600. Hereinafter, each process of driver characteristic correction will be described with reference to FIG. 6.

S601

The processing unit 120 extracts, from the driver information storage unit 150, various pieces of information (driver information) related to the previous driving of the driver driving the target vehicle 170*a*. The driver that needs to extract the driver information can be specified from the driver identification information (ID) included in the vehicle data received from the target vehicle 170*a* via the communication unit 110.

When the driver data of the driver driving the target vehicle 170*a* is extracted by the processing unit 120, the processing proceeds to S602.

S602

The processing unit 120 derives the vehicle control area corresponding to the driving tendency (preference) of the driver based on the driver information of the driver driving the target vehicle 170*a*. The vehicle control range is a range for limiting (or expanding) the vehicle control. The driving tendency (preference) of the driver can be determined by an inter-vehicle distance, a speed, an acceleration/deceleration speed, and the like taken by the driver during driving. For example, in a case where the driver takes a longer inter-vehicle distance, a vehicle control range with a wider inter-vehicle distance may be derived, or in a case where the average vehicle speed of the driver is relatively higher than that of the other drivers, a vehicle control range higher than the standard may be derived.

When the processing unit 120 derives the vehicle controlled area corresponding to the driving tendency (preference) of the driver driving the target vehicle 170*a*, the processing proceeds to S603.

S603

The processing unit 120 corrects the required control of the one or more applications 160 arbitrated by the final arbitration determination of S500 based on the vehicle control area corresponding to the driving tendency (preference) of the driver driving the target vehicle 170*a*. In this correction, it can be exemplified that the control content originally requested by each application 160 is restricted or expanded in accordance with the vehicle control range.

As an example, when the control instruction value of the vehicle control is "forward 25 m after 3 seconds" as a result of the final arbitration determination, if the driver of the target vehicle 170*a* tends to prefer a wide inter-vehicle distance, it is conceivable to correct the control instruction value to a value such as "forward 20 m after 3 seconds" or "forward 25 m after 4 seconds".

The above-described extraction of the driver information and derivation of the vehicle control range may be performed by the driver information storage unit 150 instead of the processing unit 120. In this case, the information about the driver driving the target vehicle 170*a* is transmitted from the processing unit 120 to the driver information storage unit 150 together with the derivation request of the vehicle control range.

When the request control of the application 160 is corrected by the processing unit 120 based on the vehicle control range of the driver driving the target vehicle 170*a*, the driver characteristic correction of the present S600 is completed, and the processing proceeds to S202 of FIG. 2.

S202

The processing unit 120 instructs the target vehicle 170*a* to control the demands of the one or more applications 160 that have been subjected to the above-described driver property corrections (S600). More specifically, the optimum control instruction value based on the request control (instruction value) of the one or more applications 160 subjected to the driver characteristic correction is transmitted from the information processing device 100 to the target vehicle 170*a* via the communication unit 110.

When the processing unit 120 instructs the target vehicle 170*a* to control the demands of the one or more applications 160 to which the driver characteristic is corrected, the processing returns to S201 and the vehicle control is repeated.

Effects, Etc.

As described above, according to the information processing device 100 according to the embodiment of the present disclosure, the vehicle safety permission determination, the in-vehicle control interference determination, the final arbitration determination, and the driver characteristic correction are performed on one or more vehicle controls requested from the plurality of applications 160. Through these processes, it is possible to appropriately execute a plurality of vehicle controls each requested from a plurality of applications 160.

Although an embodiment of the present disclosure has been described above, the present disclosure can be regarded as a method executed by an information processing device including not only an information processing device but also a processor and a memory, a program for executing the method, a computer-readable non-transitory storage medium storing a program, and a system including an information processing device and a vehicle.

The information processing device of the present disclosure is useful in a case where it is desired to optimally control a vehicle for a plurality of services provided from a plurality of applications.

What is claimed is:

1. An information processing device that remotely controls a vehicle, the information processing device comprising:

a processor configured to acquire a plurality of requests related to control of a target vehicle from a plurality of applications, calculate a trajectory permitted range based on future-prediction data of the target vehicle and a surrounding object, the surrounding object being present around the target vehicle, and the trajectory permitted range being set as an area where the target vehicle does not contact the surrounding object, determine an allowance level of each of the requests based on the calculated trajectory permitted range, the allowance level indicating a degree to which execution of control in accordance with each of the requests is allowed and corresponding to a collision risk with the surrounding object, determine whether one or more requests are present of which the allowance level is equal to or greater than a predetermined threshold, set a priority order for executing the one or more requests in response to the determination that the one or more requests are present, and transmit an instruction for control that is based on the priority order to the target vehicle, wherein the priority order includes at least one of the following priority orders (i) to (iii):

(i) a request for deceleration is prioritized over a request for no acceleration or deceleration;

(ii) a request for no acceleration or deceleration is prioritized over a request for acceleration; and (iii) a request for straight-ahead travel with no acceleration or deceleration is prioritized over a request for lateral acceleration in a left-right direction.

2. The information processing device according to claim 1, wherein the processor is further configured to predict a position of the target vehicle and a position of the surrounding object after a predetermined time, and the trajectory permitted range is calculated based on each of the predicted positions.

3. The information processing device according to claim 2, wherein the processor is further configured to estimate a movement position of the target vehicle within the trajectory permitted range when the control in accordance with each of the requests is performed at each of the predicted positions, and the allowance level is determined based on a distance between the estimated movement position of the target vehicle and the surrounding object.

4. The information processing device according to claim 3, wherein the processor is further configured to lower the allowance level as the target vehicle in the estimated movement position is more likely to collide with the surrounding object.

5. The information processing device according to claim 2, wherein the processor is further configured to:

receive vehicle data from a plurality of vehicles including the target vehicle; and predict the position of the target vehicle and the position of the surrounding object after the predetermined time, based on a traffic digital twin time-synchronized with a real space constructed on a virtual space based on the received vehicle data.

6. The information processing device according to claim 1, wherein the processor is further configured to discard all acquired requests from the applications in response to the determination that no request is present of which the allowance level is equal to or greater than the predetermined threshold.

7. The information processing device according to claim 1, wherein the processor is further configured to:

determine whether the control in accordance with the requests has an influence on control related to safety executed in the target vehicle; and discard all or influencing parts of the control in accordance with the requests in response to the determination that the control in accordance with the requests has the influence on the control related to the safety executed in the target vehicle.

8. The information processing device according to claim 1, wherein the processor is further configured to acquire a driving tendency of a driver of the target vehicle from a database stored in the processor, derive a vehicle control range corresponding to the driving tendency of the driver of the target vehicle, the vehicle control range including a setting value of an inter-vehicle distance applied in controlling the target vehicle, and correct the control in accordance with the requests based on the vehicle control range, and the driving tendency of the driver is determined based on information including the inter-vehicle distance, a speed, an acceleration speed, and a deceleration speed.

* * * * *